US008798679B2

(12) United States Patent
Shimizu et al.

(10) Patent No.: US 8,798,679 B2
(45) Date of Patent: Aug. 5, 2014

(54) MOBILE COMMUNICATION BASE STATION ANTENNA

(75) Inventors: Takayuki Shimizu, Hitachi (JP); Shinsuke Murano, Kasama (JP); Osamu Tasaki, Hitachi (JP)

(73) Assignee: Hitachi Metals, Ltd., Tokyo (JP)

( * ) Notice: Subject to any disclaimer, the term of this patent is extended or adjusted under 35 U.S.C. 154(b) by 516 days.

(21) Appl. No.: 12/659,254

(22) Filed: Mar. 2, 2010

(65) Prior Publication Data

US 2010/0227647 A1 Sep. 9, 2010

(30) Foreign Application Priority Data

Mar. 3, 2009 (JP) ................................ 2009-049765

(51) Int. Cl.
*H04M 1/00* (2006.01)

(52) U.S. Cl.
USPC ........ 455/562.1; 343/758; 343/815; 343/844; 343/893

(58) Field of Classification Search
CPC .............................. H04W 16/28; H01Q 21/00
USPC ...................................................... 455/562.1
See application file for complete search history.

(56) References Cited

U.S. PATENT DOCUMENTS

| | | | | |
|---|---|---|---|---|
| 5,577,265 | A * | 11/1996 | Wheatley, III | 370/335 |
| 5,602,834 | A * | 2/1997 | Dean et al. | 370/335 |
| 5,686,926 | A | 11/1997 | Kijima et al. | |
| 5,724,666 | A * | 3/1998 | Dent | 455/562.1 |
| 5,923,296 | A * | 7/1999 | Sanzgiri et al. | 343/700 MS |
| 6,005,516 | A * | 12/1999 | Reudink et al. | 342/375 |
| 6,067,053 | A * | 5/2000 | Runyon et al. | 343/797 |
| 6,094,165 | A * | 7/2000 | Smith | 342/373 |
| 6,167,286 | A * | 12/2000 | Ward et al. | 455/562.1 |
| 6,198,434 | B1 * | 3/2001 | Martek et al. | 342/373 |
| 6,201,801 | B1 * | 3/2001 | Dent | 370/342 |
| 6,211,841 | B1 * | 4/2001 | Smith et al. | 343/813 |
| 6,225,950 | B1 * | 5/2001 | Johansson et al. | 343/700 MS |
| 6,295,028 | B1 * | 9/2001 | Jonsson et al. | 343/700 MS |
| 6,351,237 | B1 * | 2/2002 | Martek et al. | 342/361 |
| 6,388,622 | B1 * | 5/2002 | Jennetti et al. | 343/700 MS |
| 6,470,177 | B1 * | 10/2002 | Andersson et al. | 455/91 |

(Continued)

FOREIGN PATENT DOCUMENTS

| | | | |
|---|---|---|---|
| JP | 6-196927 | A | 7/1994 |
| JP | 2002-135047 | A | 5/2002 |

(Continued)

OTHER PUBLICATIONS

European Search Report dated Jun. 9, 2010.

(Continued)

*Primary Examiner* — Hai V Nguyen
(74) *Attorney, Agent, or Firm* — McGinn IP Law Group, PLLC

(57) ABSTRACT

A mobile communication base station antenna has a plurality of polarization diversity antenna blocks, each of the polarization diversity antenna blocks including a plurality of polarization diversity antenna elements, each of the polarization diversity antenna elements including antenna elements that are disposed to be orthogonal to each other. The polarization diversity antenna elements of one of the polarization diversity antenna blocks are interposed between the polarization diversity antenna elements of another one of the polarization diversity antenna blocks, and tilt angles in the vertical plane of the respective polarization diversity antenna blocks are different from each other.

18 Claims, 17 Drawing Sheets

(56) References Cited

U.S. PATENT DOCUMENTS

| | | | | |
|---|---|---|---|---|
| 6,583,760 | B2 * | 6/2003 | Martek et al. | 342/373 |
| 6,745,051 | B1 * | 6/2004 | Bassirat | 455/562.1 |
| 6,747,606 | B2 * | 6/2004 | Harel et al. | 343/808 |
| 6,791,507 | B2 * | 9/2004 | Johansson et al. | 343/853 |
| 6,816,124 | B2 * | 11/2004 | Tillery | 343/797 |
| 6,844,863 | B2 * | 1/2005 | Judd et al. | 343/853 |
| 6,900,775 | B2 * | 5/2005 | Shapira | 343/844 |
| 6,933,905 | B2 * | 8/2005 | Ippolito | 343/797 |
| 6,937,206 | B2 * | 8/2005 | Puente Baliarda et al. | 343/853 |
| 7,068,222 | B2 * | 6/2006 | Koparan et al. | 343/700 MS |
| 7,230,570 | B2 * | 6/2007 | Thomas et al. | 342/372 |
| 7,242,720 | B2 * | 7/2007 | Sugiyama et al. | 375/260 |
| 7,254,171 | B2 * | 8/2007 | Hudson | 375/229 |
| 7,272,364 | B2 * | 9/2007 | Frank et al. | 455/101 |
| 7,277,731 | B2 * | 10/2007 | Stratis et al. | 455/562.1 |
| 7,308,270 | B2 * | 12/2007 | Lastinger et al. | 455/450 |
| 7,409,001 | B2 * | 8/2008 | Ionescu et al. | 375/267 |
| 7,415,288 | B1 * | 8/2008 | Hou et al. | 455/562.1 |
| 7,420,507 | B2 * | 9/2008 | Thomas et al. | 342/368 |
| 7,433,713 | B2 * | 10/2008 | Haskell et al. | 455/562.1 |
| 7,460,082 | B2 * | 12/2008 | Li et al. | 343/893 |
| 7,538,740 | B2 * | 5/2009 | Korisch et al. | 343/844 |
| 7,660,573 | B2 * | 2/2010 | Elmaleh | 455/406 |
| 7,751,372 | B2 * | 7/2010 | Monsen | 370/335 |
| 7,808,440 | B2 * | 10/2010 | Iizuka et al. | 343/802 |
| 7,808,443 | B2 * | 10/2010 | Lindmark et al. | 343/844 |
| 7,965,993 | B2 * | 6/2011 | Lindgren | 455/226.1 |
| 8,059,553 | B2 * | 11/2011 | Leung et al. | 370/252 |
| 8,077,111 | B2 * | 12/2011 | Derneryd et al. | 343/853 |
| 8,165,095 | B2 * | 4/2012 | Stratis et al. | 370/332 |
| 8,165,637 | B2 * | 4/2012 | Park et al. | 455/562.1 |
| 8,185,162 | B2 * | 5/2012 | Haskell et al. | 455/562.1 |
| 8,237,602 | B2 * | 8/2012 | Huneycutt, Sr. | 342/13 |
| 8,368,609 | B2 * | 2/2013 | Morrow et al. | 343/810 |
| 8,422,540 | B1 * | 4/2013 | Negus et al. | 375/219 |
| 8,467,363 | B2 * | 6/2013 | Lea et al. | 370/338 |
| 2002/0011954 | A1 * | 1/2002 | Judd et al. | 343/700 MS |
| 2002/0021246 | A1 * | 2/2002 | Martek et al. | 342/373 |
| 2002/0140618 | A1 * | 10/2002 | Plet et al. | 343/797 |
| 2002/0173342 | A1 * | 11/2002 | Kanamaluru et al. | 455/562 |
| 2003/0073463 | A1 * | 4/2003 | Shapira | 455/562 |
| 2004/0066333 | A1 * | 4/2004 | Judd et al. | 343/700 MS |
| 2004/0127174 | A1 * | 7/2004 | Frank et al. | 455/101 |
| 2004/0145526 | A1 * | 7/2004 | Puente Baliarda et al. | 343/700 MS |
| 2004/0157645 | A1 * | 8/2004 | Smith et al. | 455/562.1 |
| 2004/0201543 | A1 | 10/2004 | Gottl et al. | |
| 2004/0209572 | A1 * | 10/2004 | Thomas | 455/63.4 |
| 2005/0101352 | A1 * | 5/2005 | Logothetis et al. | 455/562.1 |
| 2005/0146470 | A1 * | 7/2005 | Li et al. | 343/702 |
| 2005/0250453 | A1 * | 11/2005 | Lastinger et al. | 455/63.4 |
| 2005/0282553 | A1 * | 12/2005 | Lastinger et al. | 455/450 |
| 2006/0286974 | A1 * | 12/2006 | Gore et al. | 455/422.1 |
| 2007/0030208 | A1 * | 2/2007 | Linehan | 343/757 |
| 2007/0049347 | A1 * | 3/2007 | Jin et al. | 455/562.1 |
| 2007/0080886 | A1 * | 4/2007 | Thomas et al. | 343/824 |
| 2007/0147251 | A1 * | 6/2007 | Monsen | 370/235 |
| 2007/0285312 | A1 * | 12/2007 | Gao et al. | 342/367 |
| 2009/0034448 | A1 * | 2/2009 | Miller et al. | 370/316 |
| 2009/0052411 | A1 * | 2/2009 | Leung et al. | 370/338 |
| 2009/0289864 | A1 | 11/2009 | Derneryd et al. | |
| 2010/0007573 | A1 * | 1/2010 | Kuramoto et al. | 343/843 |
| 2010/0066634 | A1 * | 3/2010 | Derneryd et al. | 343/893 |
| 2010/0097286 | A1 * | 4/2010 | Morrow et al. | 343/810 |
| 2010/0225552 | A1 * | 9/2010 | Shimizu et al. | 343/758 |
| 2010/0227646 | A1 * | 9/2010 | Ogawa et al. | 455/562.1 |
| 2010/0283705 | A1 * | 11/2010 | Achour et al. | 343/844 |
| 2011/0199992 | A1 * | 8/2011 | Barker et al. | 370/329 |
| 2012/0280878 | A1 * | 11/2012 | Timofeev | 343/793 |
| 2013/0002505 | A1 * | 1/2013 | Teillet et al. | 343/835 |
| 2013/0009839 | A1 * | 1/2013 | Nghiem et al. | 343/843 |

FOREIGN PATENT DOCUMENTS

| | | | | |
|---|---|---|---|---|
| JP | 2005-203841 | | 7/2005 | |
| JP | 2008-523708 | A | 7/2008 | |
| WO | WO 2008/063111 | A1 | 5/2008 | |
| WO | WO 2008063111 | A1 * | 5/2008 | H01Q 3/26 |
| WO | WO 2008/126857 | A1 | 10/2008 | |

OTHER PUBLICATIONS

"Signal correlations and diversity gain of two-beam microcell antenna", Lempiainen, J.J.A.; Nikoskinen, K.I.; Nokia Telecommun, Issue Date: Aug. 1998, vol. 47 Issue: 3, IEEE Transactions on Vehicular Technology, on pp. 755-765, ISSN: 0018-9545, Sponsored by: IEEE Vehicular Technology Society, INSPEC Accession No. 6002476 Digital Object Identifier: 10.1109/25.704831.

Japanese Office Action dated Apr. 23, 2013 with English translation thereof.

US Office Action dated Aug. 1, 2013 in U.S. Appl. No. 12/659,256.

Japanese Office Action dated May 21, 2013 with English translation thereof.

* cited by examiner

CONNECTED TO THE FIRST PORT

CONNECTED TO THE THIRD PORT

CONNECTED TO THE SECOND PORT

CONNECTED TO THE FOURTH PORT

TILT ANGLES
THE FIRST PORT: 3 DEGREES
THE SECOND PORT: 3 DEGREES
THE THIRD PORT: 3 DEGREES
THE FOURTH PORT: 3 DEGREES

TILT ANGLES
THE FIRST PORT: 3 DEGREES
THE SECOND PORT: 3 DEGREES
THE THIRD PORT: 6 DEGREES
THE FOURTH PORT: 6 DEGREES

MOBILE COMMUNICATION BASE STATION ANTENNA

The present application is based on Japanese Patent Application No. 2009-049765 filed on Mar. 3, 2009, the entire contents of which are incorporated herein by reference.

BACKGROUND OF THE INVENTION

1. Field of the Invention

The present invention relates to a dual-polarized antenna and an antenna block, more particularly, to a mobile communication base station antenna for realizing a Space Division Multiple Access (SDMA).

2. Related Art

In general, conventional mobile communication base station antenna has a sharp vertical plane directivity as shown in FIG. 15, so as to suppress interference to other cells. Referring to FIG. 15, in a mobile communication base station antenna 940, a main beam direction 942 of the mobile communication base station antenna 940 provides a tilt angle 941 in the vertical plane with respect to a horizontal direction.

In the mobile communications, particularly, in portable phone communications, MIMO (Multiple Input Multiple Output) communication becomes popular. In the MIMO communication, data transmission efficiency can be enhanced by employing plural antenna as transmitting antenna and receiving antenna, respectively. In comparison with communication speed in the case of using one transmitting antenna and one receiving antenna, communication speed in the case of using two transmitting antennas and two receiving antennas is theoretically double, and communication speed in the case of using four transmitting antennas and four receiving antennas is theoretically four times.

In the MIMO communication, correlation of signals from respective transmitting antennas to respective receiving antennas becomes important. In particular, a channel capacity of the transmitting antenna is influenced by a correlation coefficient between the respective transmitting antennas, and a channel capacity of the receiving antenna is influenced by a correlation coefficient between the respective receiving antennas. For example, in the 4×4 MIMO communication using four transmitting antennas and four receiving antennas, when there is "no correlation", namely, the correlation coefficient is substantially zero (0), between the respective antennas, the communication speed is close to 4 times which is theoretically established. On the other hand, when the correlation coefficient is substantially 1, the effect of the MIMO communication cannot be expected. In practical use, it is preferable that the correlation coefficient between the antennas is 0.7 or less.

For example, Japanese Patent Laid-Open No. 2005-203841 (JP-A 2005-203841) discloses a conventional polarization diversity antenna element used in a mobile phone base station antenna.

So as to decrease the correlation coefficient, it is sufficient to spatially or electrically divide (separate) the antenna. By way of example only, the conventional polarization diversity antenna element used in the mobile phone base station antenna disclosed by JP-A 2005-203841 is a two-system antenna which is divided by polarization. Therefore, if such an antenna is used for an antenna block, it can be converted into a base station antenna for 2×2 MIMO communication.

By way of example only, for the case of 4×4 MIMO communication, if a distance between two antennas is increased, namely, the two antennas are distant from each other, the correlation coefficient will be decreased in accordance with the increase in distance. Therefore, referring to FIGS. 16 and 17, it is requested that a distance between two polarization diversity antenna blocks 1001, 1001 that are juxtaposed (FIG. 16) or vertically arranged in a column (FIG. 17) should be increased as much as possible. However, there is another request inconsistent with the former request, namely, it is also requested that the distance between the two polarization diversity antenna blocks 1001, 1001 should be decreased as much as possible, since a volume (space) required for antenna installation increases when the distance between the two antennas is increased too much.

SUMMARY OF THE INVENTION

Therefore, an object of the present invention is to provide a mobile communication base station antenna, in which the correlation coefficient between respective antenna blocks is decreased by changing a tilt angle in the vertical plane of the antenna block.

According to a feature of the invention, a mobile communication base station antenna comprises:

a plurality of polarization diversity antenna blocks, each of the polarization diversity antenna blocks comprising a plurality of polarization diversity antenna elements, each of the polarization diversity antenna elements comprising antenna elements that are disposed to be orthogonal to each other, wherein the polarization diversity antenna elements of one of the polarization diversity polarization diversity antenna blocks are interposed between the polarization diversity antenna elements of another one of the polarization diversity polarization diversity antenna blocks, and tilt angles in the vertical plane of the respective polarization diversity polarization diversity antenna blocks are different from each other.

In the mobile communication base station antenna, the polarization diversity antenna blocks may be vertically arranged in the vertical plane, and the tilt angles in the vertical plane of the respective polarization diversity antenna blocks may be determined such that a correlation coefficient between the respective polarization diversity antenna blocks is 0.7 or less.

In the mobile communication base station antenna, the tilt angles in the vertical plane of the respective polarization diversity antenna blocks may be arbitrarily set by mechanically changing a direction of each of the polarization diversity antenna blocks.

In the mobile communication base station antenna, the tilt angles in the vertical plane of the respective polarization diversity antenna blocks may be arbitrarily set by shifting a signal phase by a phase shifter.

In the mobile communication base station antenna, the phase shifter may be a fixed phase shifter in which a shift amount of the signal phase is fixed.

Alternatively, in the mobile communication base station antenna, the phase shifter may be a variable phase shifter in which a shift amount of the signal phase is freely determined.

ADVANTAGES OF THE INVENTION

The present invention provides following excellent effects.

(1) The correlation coefficient between the respective antenna blocks can be decreased.

(2) The increase in volume (space) required for antenna installation can be suppressed.

BRIEF DESCRIPTION OF THE DRAWINGS

Next, the mobile communication base station antenna in embodiments according to the invention will be explained in conjunction with appended drawings, wherein:

FIGS. 3A and 3B are explanatory diagrams of a structure of a polarization diversity antenna block in the mobile communication base station antenna in the embodiment according to the invention, wherein FIG. 3A is a front view thereof and FIG. 3B is a side view thereof;

FIGS. 10A to 10E are schematic diagrams showing elevational views of the mobile communication base station antenna of FIG. 1 that are disassembled by antenna blocks comprising antenna elements connected to respective ports, wherein FIG. 10A shows an elevational view of the mobile communication base station antenna comprising antenna blocks, FIG. 10B is an elevational view of an antenna block connected to the first port, FIG. 10C is an elevational view of an antenna block connected to the third port, FIG. 10D is an elevational view of an antenna block connected to the second port, FIG. 10E is an elevational view of an antenna block connected to the fourth port;

FIGS. 11A to 11E are schematic diagrams showing perspective views of the mobile communication base station antenna of FIG. 1 that are disassembled by antenna blocks comprising antenna elements connected to respective ports, wherein FIG. 11A shows a perspective view of the mobile communication base station antenna comprising antenna blocks, FIG. 11B is a perspective view of an antenna block connected to the first port, FIG. 11C is a perspective view of an antenna block connected to the third port, FIG. 11D is a perspective view of an antenna block connected to the second port, FIG. 11E is a perspective view of an antenna block connected to the fourth port;

DETAILED DESCRIPTION OF THE EMBODIMENTS

Next, the embodiments according to the present invention will be explained below in more detail in conjunction with appended drawings.

(Points of the Invention)

In the present invention, polarization diversity antenna elements in one polarization diversity antenna block are disposed alternately in overlap arrangement for plural stages between polarization diversity antenna elements in another polarization diversity antenna block. According to this structure, a dimension in a longitudinal direction can be decreased and an increase in volume required for antenna installation can be suppressed.

As described above, in the antenna block having a configuration in which the polarization diversity antenna elements provided in different antenna blocks (i.e. different polarization diversity antenna blocks) are partially overlapped, it is expected that the antenna correlation coefficient between the respective antenna blocks can be reduced by changing a tilt angle in the vertical plane of each of the antenna blocks. In other words, the tilts angle in the vertical plane of the respective antenna blocks, each of which comprises a plurality of antenna elements disposed to be orthogonal to each other, are set to be different from each other in the mobile communication base station antenna having a sharp directivity in the vertical plane, in order to provide a difference in the directivities of the respective antenna blocks. As a result, the antenna correlation coefficient between the respective antenna blocks can be reduced.

In the present invention, the tilt angle in the vertical plane may be fixed or variable. The tilt angle in the vertical plane of the antenna element included in the antenna block can be mechanically changed by changing a direction of the antenna block. In addition, the tilt angle in the vertical plane of the antenna element included in the antenna block can be arbitrarily changed by changing a phase of an electric power fed to the antenna element. When the phase shifter is used for changing the phase, the phase shifter may be a fixed phase shifter in which a shift amount of signal phase is fixed to a constant value. The phase shifter may be a variable (tunable) phase shifter in which the shift amount of the signal phase can be set freely.

EMBODIMENTS

Next, a mobile communication base station antenna in the embodiments according to the invention will be explained below in conjunction with appended drawings.

First Embodiment

Figure 1:
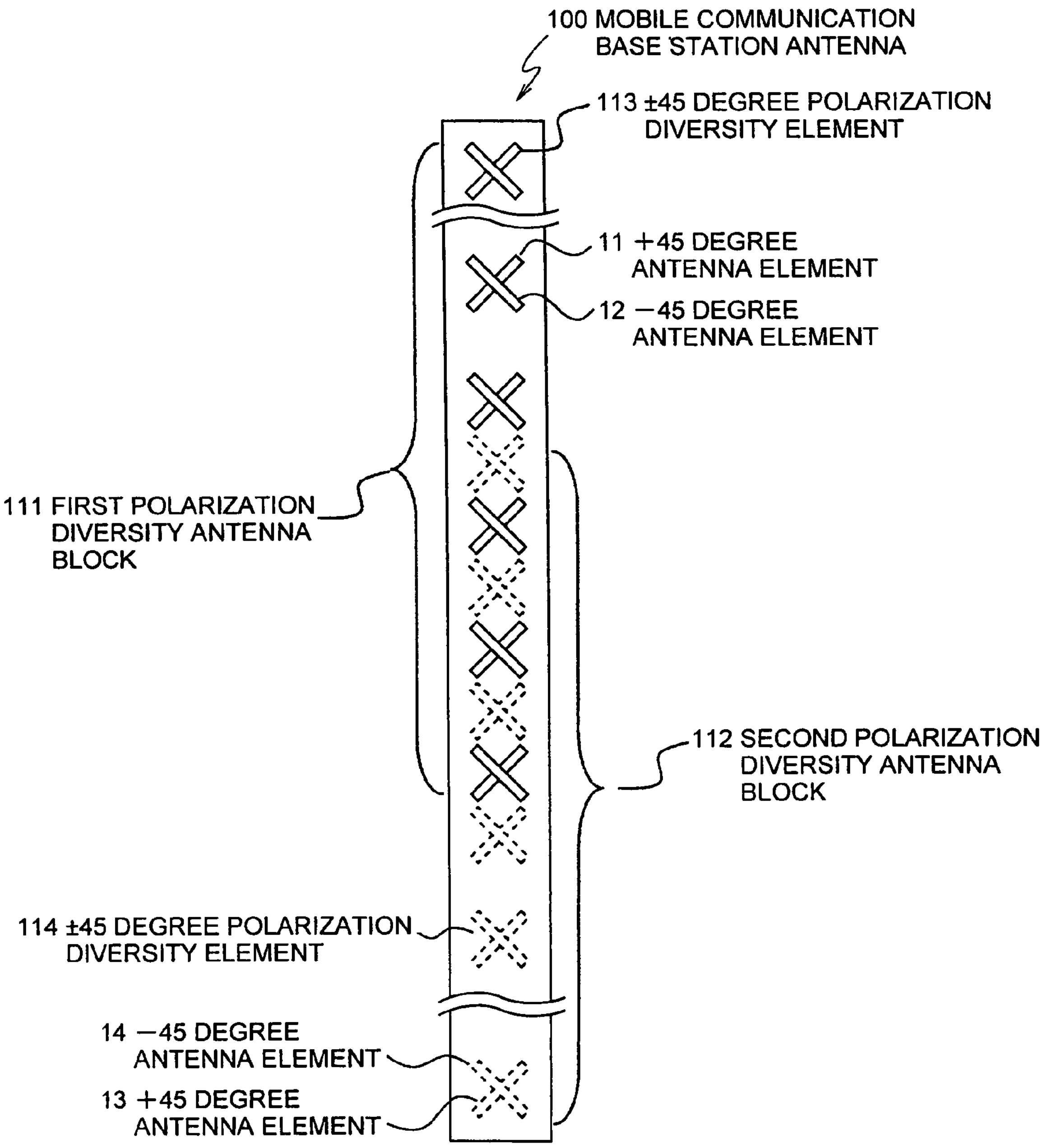
FIG. 1 is a schematic diagram showing an elevational view of a mobile communication base station antenna in a first embodiment according to the invention.

FIG. 1 is a schematic diagram showing an elevational view of a mobile communication base station antenna 100 in the first embodiment according to the invention.

Referring to FIG. 1, a mobile communication base station antenna 100 of the present invention comprises a plurality of antenna blocks (first polarization diversity antenna block 111 and second polarization diversity antenna block 112), each of which comprises a plurality of polarization diversity antenna elements (±45 degree polarization diversity elements 113, 114), each of which comprises a plurality of antenna elements (+45 degree antenna element 11 and −45 degree antenna element 12, and +45 degree antenna element 13 and −45 degree antenna element 14) that are disposed to be orthogonal to each other, in which the polarization diversity antenna elements (±45 degree polarization diversity elements 113, expressed in solid line) of one of the polarization diversity antenna blocks (first polarization diversity antenna block 111) are alternately interposed between the polarization diversity antenna elements (±45 degree polarization diversity elements 114, expressed in broken line) of another one of the polarization diversity antenna blocks (second polarization diversity antenna block 112), and tilt angles in the vertical plane of the respective antenna blocks (first polarization diversity antenna block 111 and second polarization diversity antenna block 112) are different from each other.

Figure 5:
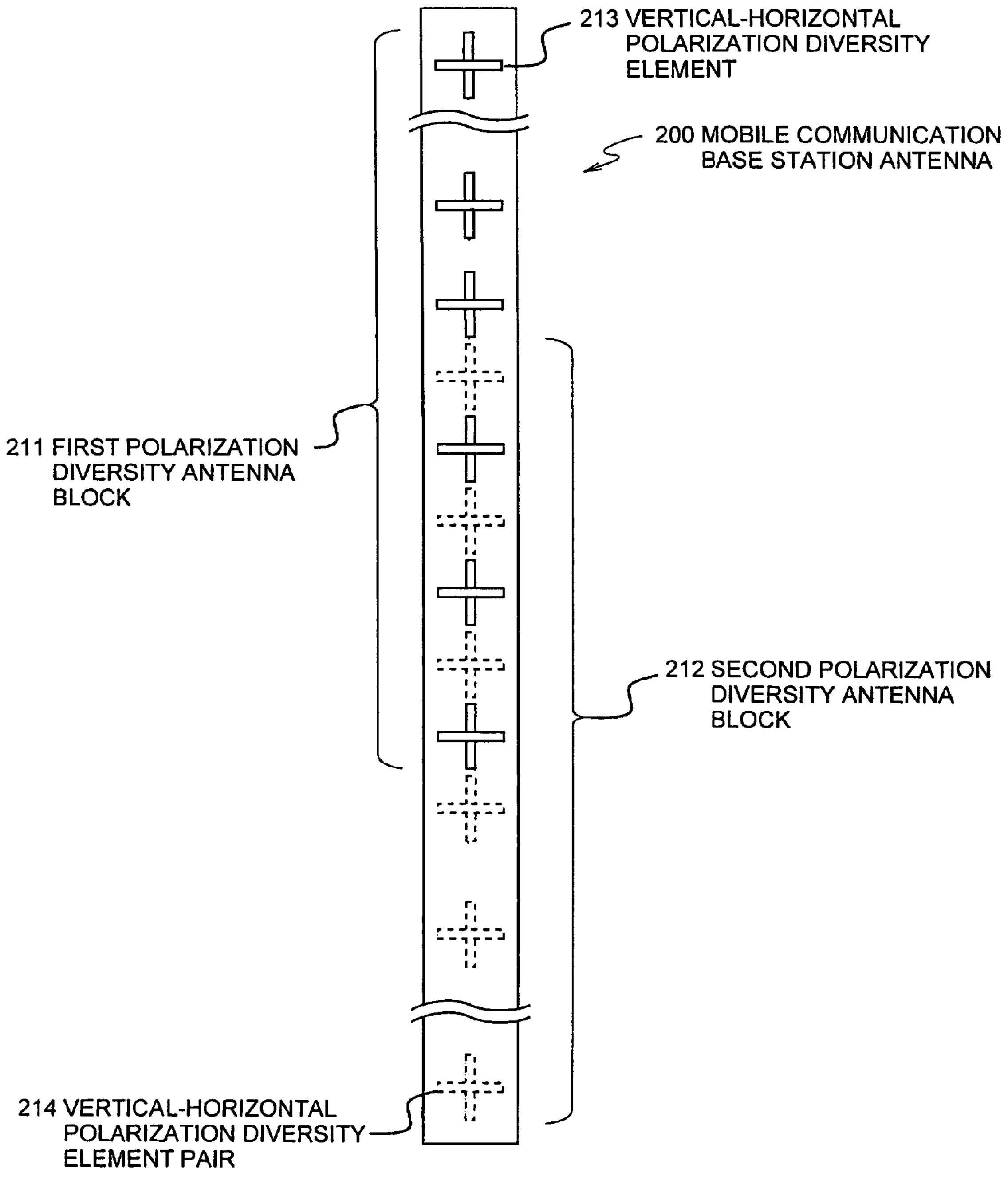
FIG. 5 is a schematic diagram showing an elevational view of a mobile communication base station antenna in a second embodiment according to the invention.

In FIGS. 1, 3 and 5, a series of the polarization diversity antenna elements are partially omitted from drawings.

In the mobile communication base station antenna 100 of FIG. 1, the first polarization diversity antenna block 111 and the second polarization diversity antenna block 112 are combined with each other to be vertically arranged.

The polarization diversity antenna elements (the ±45 degree polarization diversity elements 113, 114) are disposed with a predetermined distance in the vertical direction in each of the polarization diversity antenna blocks (the first polarization diversity antenna block 111 and the second polarization diversity antenna block 112). In an overlapped portion, the ±45 degree polarization diversity elements 114 of the second polarization diversity antenna block 112 are interposed between each interval between the respective ±45 degree polarization diversity elements 113 of the first polarization diversity antenna block 111.

In the mobile communication base station antenna 100 of FIG. 1, each of the +45 degree polarization diversity antenna elements 113, 114 comprises +45 degree polarization diversity and −45 degree polarization diversity. Each of the first polarization diversity antenna block 111 and the second polarization diversity antenna block 112 provides the polarization diversity, so that the mobile communication base station antenna 100 of FIG. 1 comprises four antenna blocks divided by space and polarization. Accordingly, the mobile communication base station antenna 100 can be used as an array antenna for 4×4 MIMO communication.

Figure 2:
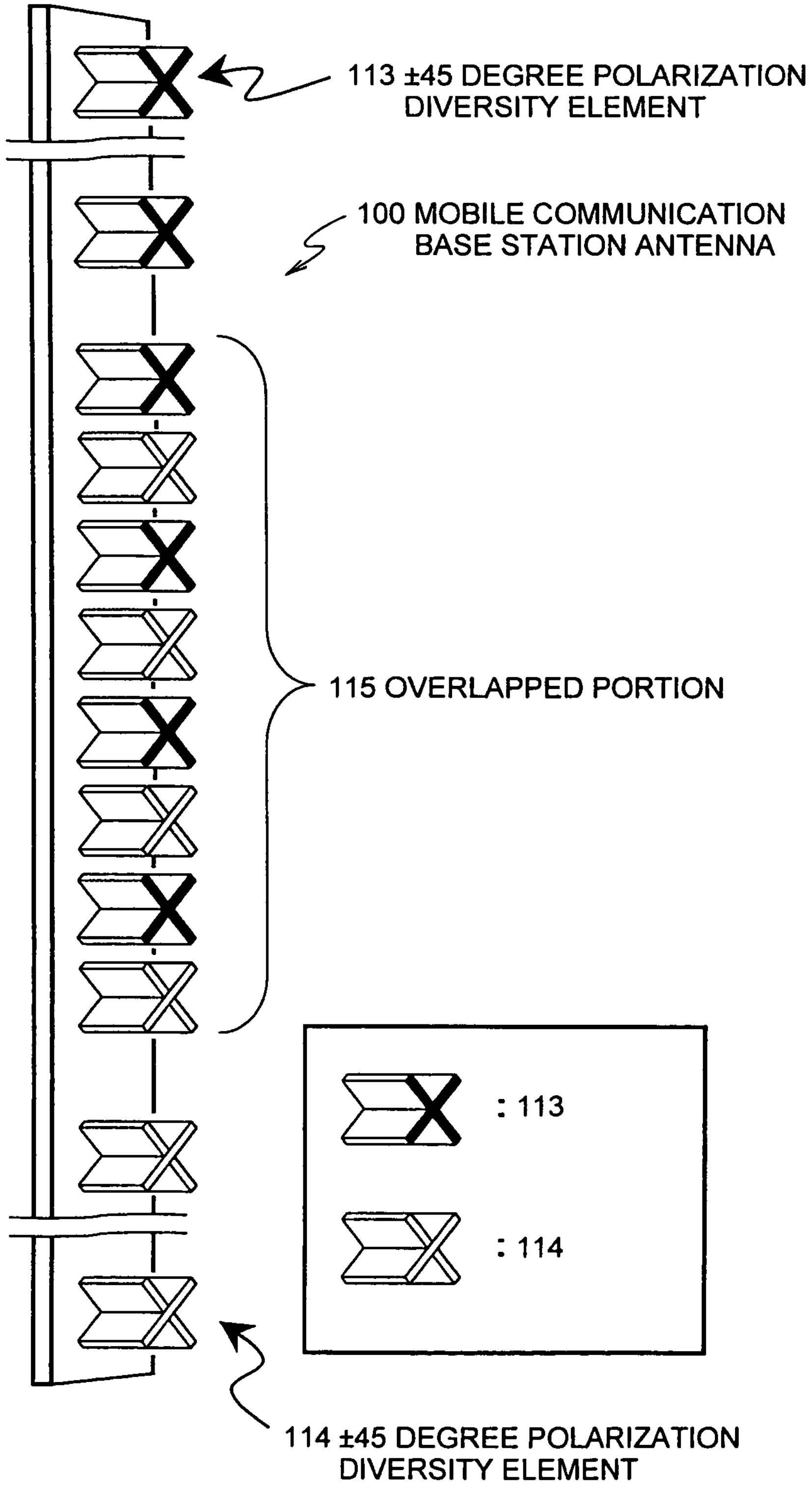
FIG. 2 is a schematic diagram showing a perspective view of the mobile communication base station antenna of FIG. 1.

FIG. 2 is a schematic diagram showing a perspective view of the mobile communication base station antenna of FIG. 1.

Referring to FIG. 2, the ±45 degree polarization diversity antenna elements 113, 114 are disposed with a predetermined interval in the vertical direction. In an overlapped portion 115, the ±45 degree polarization diversity elements 114 composing the second polarization diversity antenna block 112 are interposed between each interval between the respective ±45 degree polarization diversity elements 113 composing the first polarization diversity antenna block 111. In FIG. 2, an upper part of each of the ±45 degree polarization diversity elements 113 is colored in black for convenience, so as to clarify a difference between the ±45 degree polarization diversity elements 113 and the ±45 degree polarization diversity elements 114. However, there is no difference in appearance between the ±45 degree polarization diversity elements 113 and the ±45 degree polarization diversity elements 114.

Figure 3A:
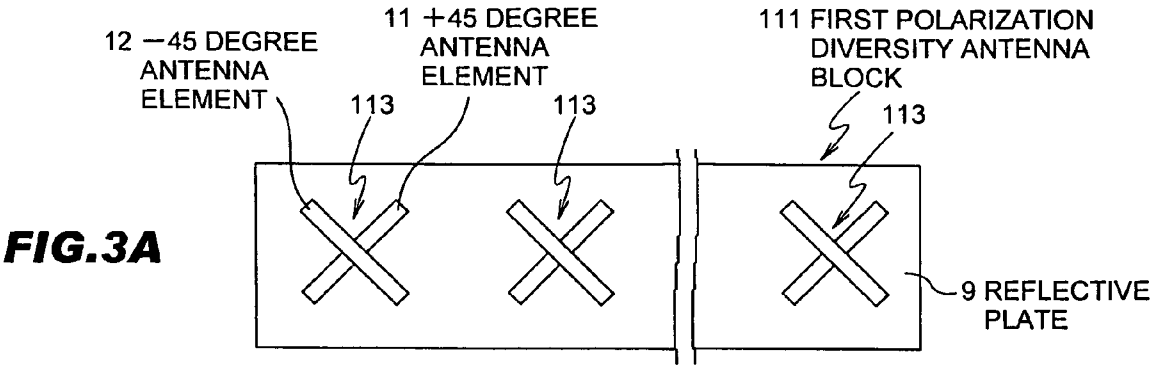
Figure 3B:
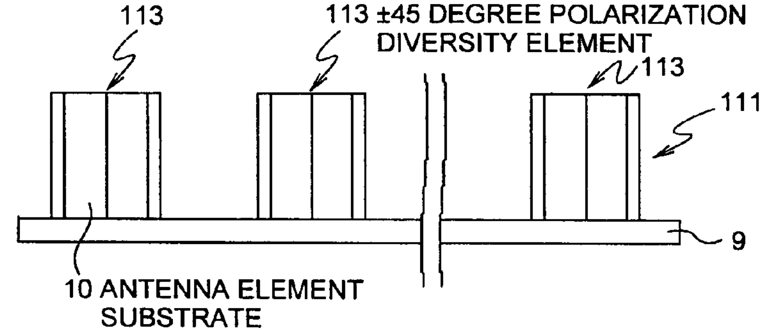
Figure 4:
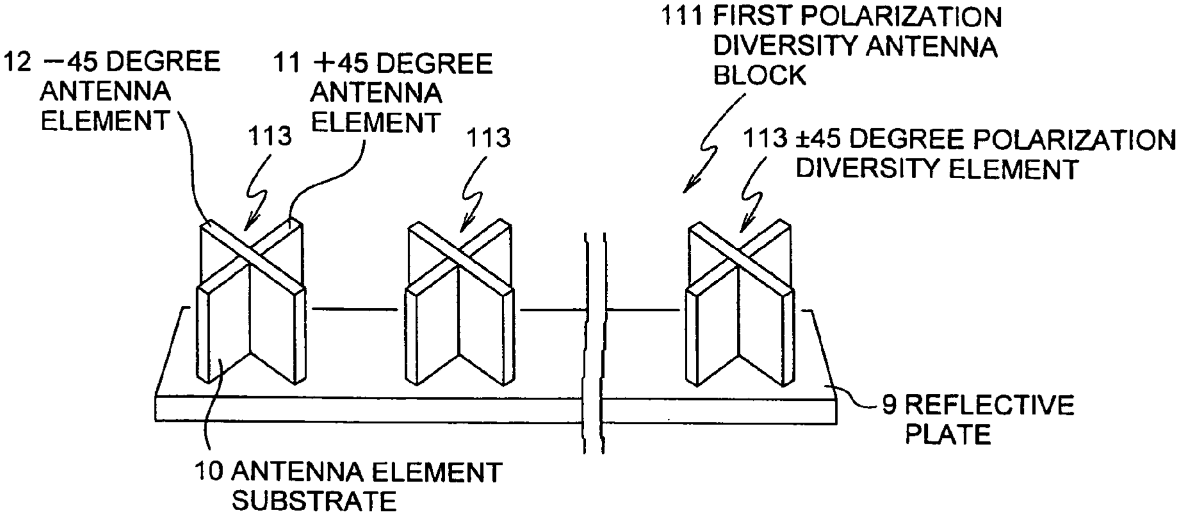
FIG. 4 is an explanatory diagram showing a perspective view of the polarization diversity antenna block in the mobile communication base station antenna in the embodiment shown in FIG. 1.

FIGS. 3A and 3B are explanatory diagrams of a structure of the first polarization diversity antenna block 111 in the mobile communication base station antenna in the embodiment according to the invention, wherein FIG. 3A is a front view thereof and FIG. 3B is a side view thereof. FIG. 4 is an explanatory diagram showing a perspective view of the first polarization diversity antenna block 111 in the mobile communication base station antenna in the embodiment shown in FIG. 1. In FIGS. 3A, 3B and FIG. 4, although the first polarization diversity antenna block 111 is shown, the first polarization diversity antenna block 111 has a structure similar to the second polarization diversity antenna block 112.

As shown in FIGS. 3A-3B and FIG. 4, the first polarization diversity antenna block 111 has a structure in which the ±45 degree polarization diversity antenna elements are disposed in the array shape along a longitudinal direction of a reflective plate 9. The antenna elements (±45 degree antenna elements 113 in FIGS. 3A-3B and FIG. 4) 113 are construed by combining the +45 degree antenna element 11 and the −45 degree antenna element 12 to have a cross-shape in its cross sectional view. Each of the antenna elements 11, 12 is construed by forming an antenna element pattern (not shown) comprising a metal, a combination of the metal and a dielectric material, or the like on a surface of an antenna element substrate 10. It is possible to transmit and receive electric waves as +45 degree polarized wave and −45 degree polarized wave in dual mode by using the ±45 degree polarization diversity antenna element. The antenna elements 11, 12 are respectively connected to different port (feeding points, not shown) via feeding lines (not shown).

According to the present invention, positions of the antenna elements may be changed, and a combination of antenna elements in the polarization diversity antenna element may be changed.

Second Embodiment

FIG. 5 is a schematic diagram showing an elevational view of a mobile communication base station antenna 200 in the second embodiment according to the invention.

Referring to FIG. 5, the mobile communication base station antenna 200 comprises a first polarization diversity antenna block 211 comprising vertical-horizontal polarization diversity antenna elements 213 and a second polarization diversity antenna block 212 comprising vertical-horizontal polarization antenna elements 214. In the mobile communication base station antenna 200, the ±45 degree polarization diversity elements 113, 114 are replaced with the vertical-horizontal polarization diversity antenna elements 213, 214. In FIG. 5, the vertical-horizontal polarization diversity antenna elements 213 is expressed in solid line, and the vertical-horizontal polarization diversity antenna elements 214 is expressed in broken line. The vertical-horizontal polarization diversity antenna elements 213 and the vertical-horizontal polarization diversity antenna elements 214 composes different polarization diversity antenna blocks 211, 212, respectively.

Figure 6:
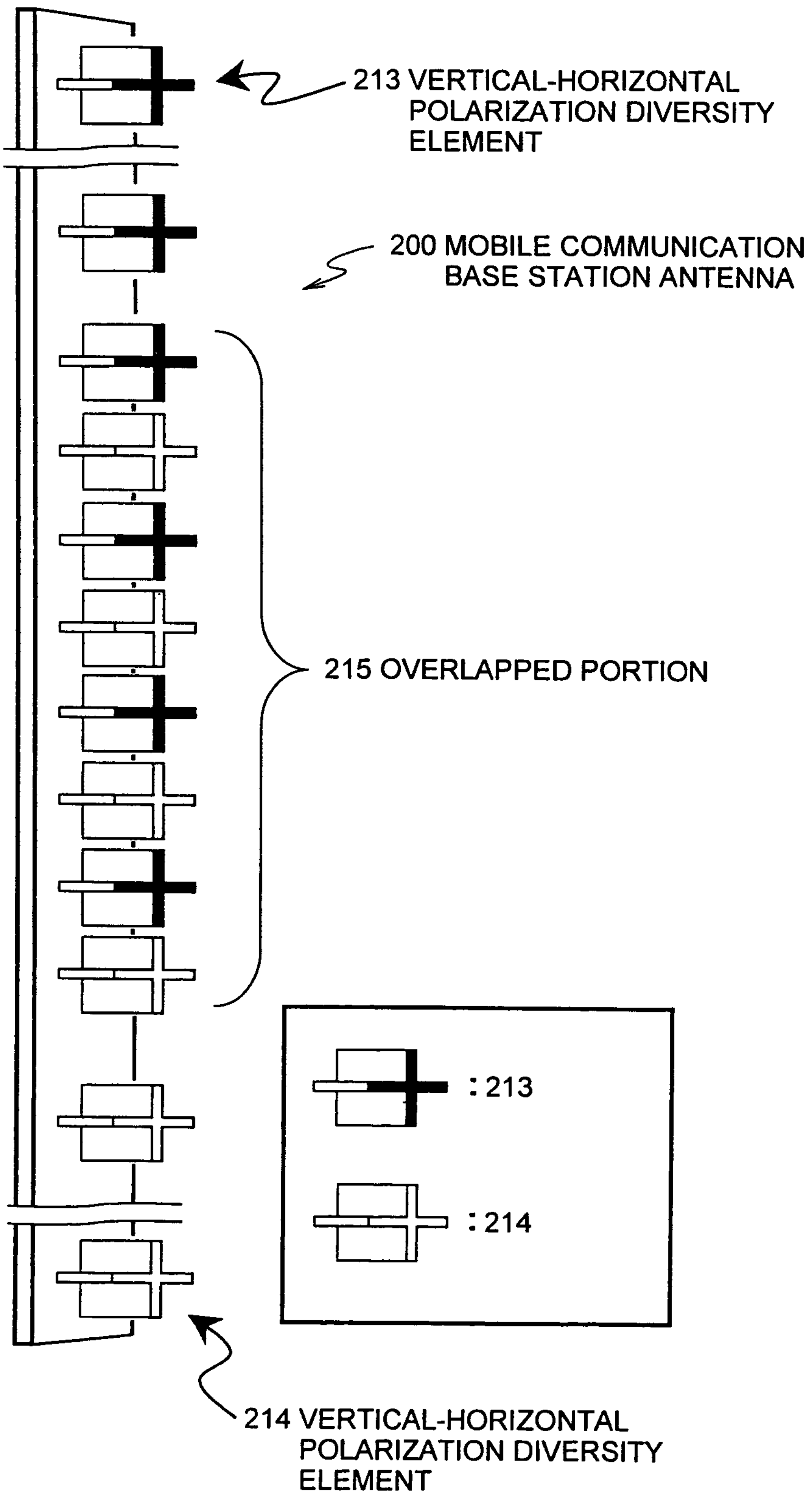
FIG. 6 is a schematic diagram showing a perspective view of the mobile communication base station antenna of FIG. 5.

FIG. 6 is a schematic diagram showing a perspective view of the mobile communication base station antenna 200 of FIG. 5.

Referring to FIG. 6, the vertical-horizontal polarization diversity antenna elements 213, 214 are disposed with a predetermined interval in the vertical direction. In an overlapped portion 215, the vertical-horizontal polarization diversity elements 214 composing the second polarization diversity antenna block 212 are interposed between each interval between the respective vertical-horizontal polarization diversity elements 213 composing the first polarization diversity antenna block 211. In FIG. 6, an upper part of each of the vertical-horizontal polarization diversity elements 213 is colored in black for convenience, so as to clarify a difference between the vertical-horizontal polarization diversity elements 213 and the vertical-horizontal polarization diversity elements 214. However, there is no difference in appearance between the vertical-horizontal polarization diversity elements 213 and the vertical-horizontal degree polarization diversity elements 214.

Third Embodiment

Figure 7:
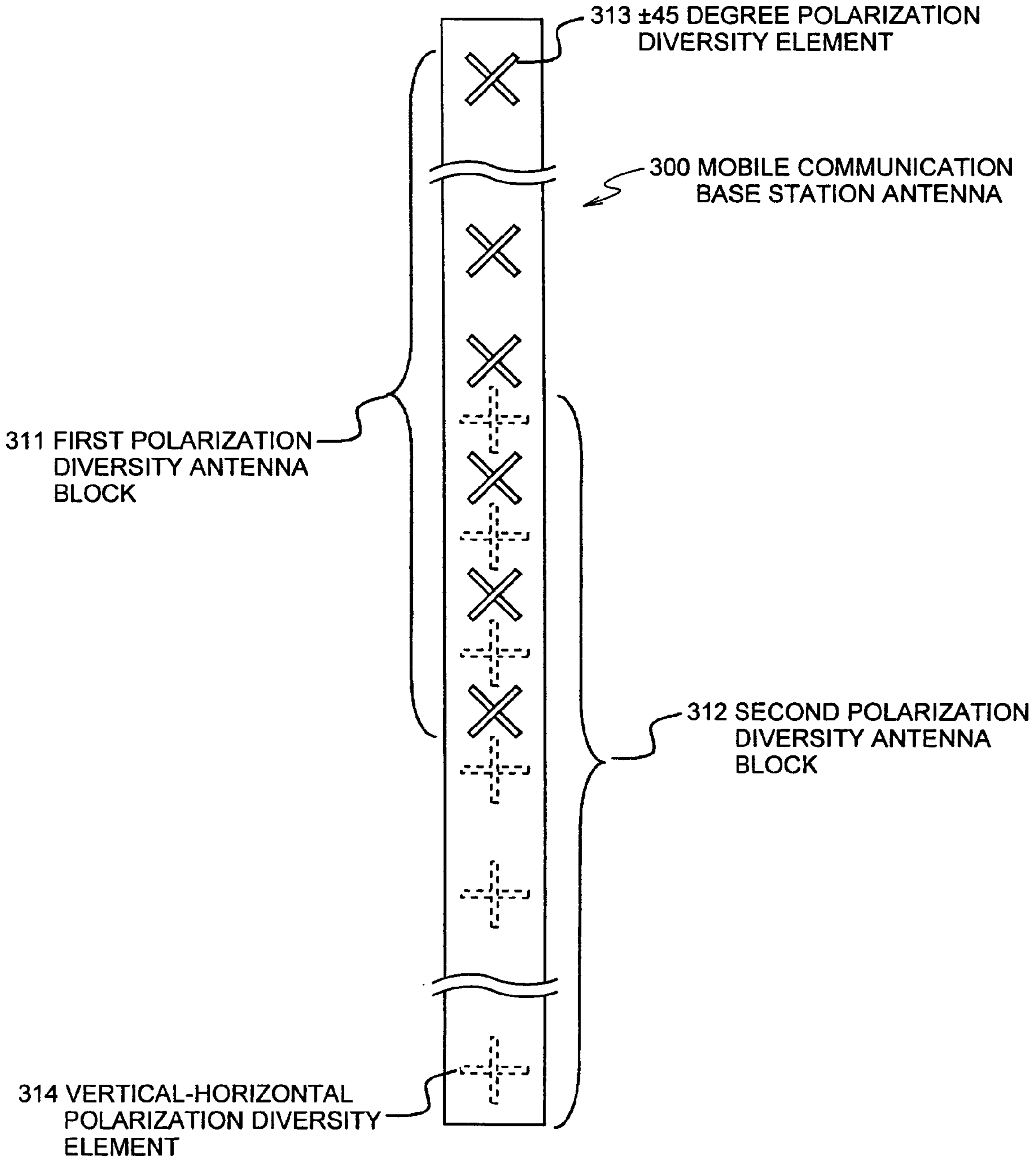
FIG. 7 is a schematic diagram showing an elevational view of a mobile communication base station antenna in a third embodiment according to the invention.

FIG. 7 is a schematic diagram showing an elevational view of a mobile communication base station antenna 300 in the third embodiment according to the invention.

Referring to FIG. 7, the mobile communication base station antenna 300 comprises a first polarization diversity antenna block 311 comprising ±45 degree polarization diversity antenna elements 313 and a second polarization diversity antenna block 312 comprising vertical-horizontal polarization antenna elements 314. In the mobile communication base station antenna 300, the ±45 degree polarization diversity elements 313 are combined with the vertical-horizontal polarization diversity antenna elements 314. Inasmuch as the antenna elements emitting linear polarized wave are combined, the shape of the antenna elements is not limited.

In FIG. 7, the ±45 degree polarization diversity antenna elements 313 is expressed in solid line, and the vertical-horizontal polarization diversity antenna elements 314 is expressed in broken line. The ±45 degree polarization diversity antenna elements 313 and the vertical-horizontal polarization diversity antenna elements 314 composes different polarization diversity antenna blocks 311, 312, respectively.

Figure 8:
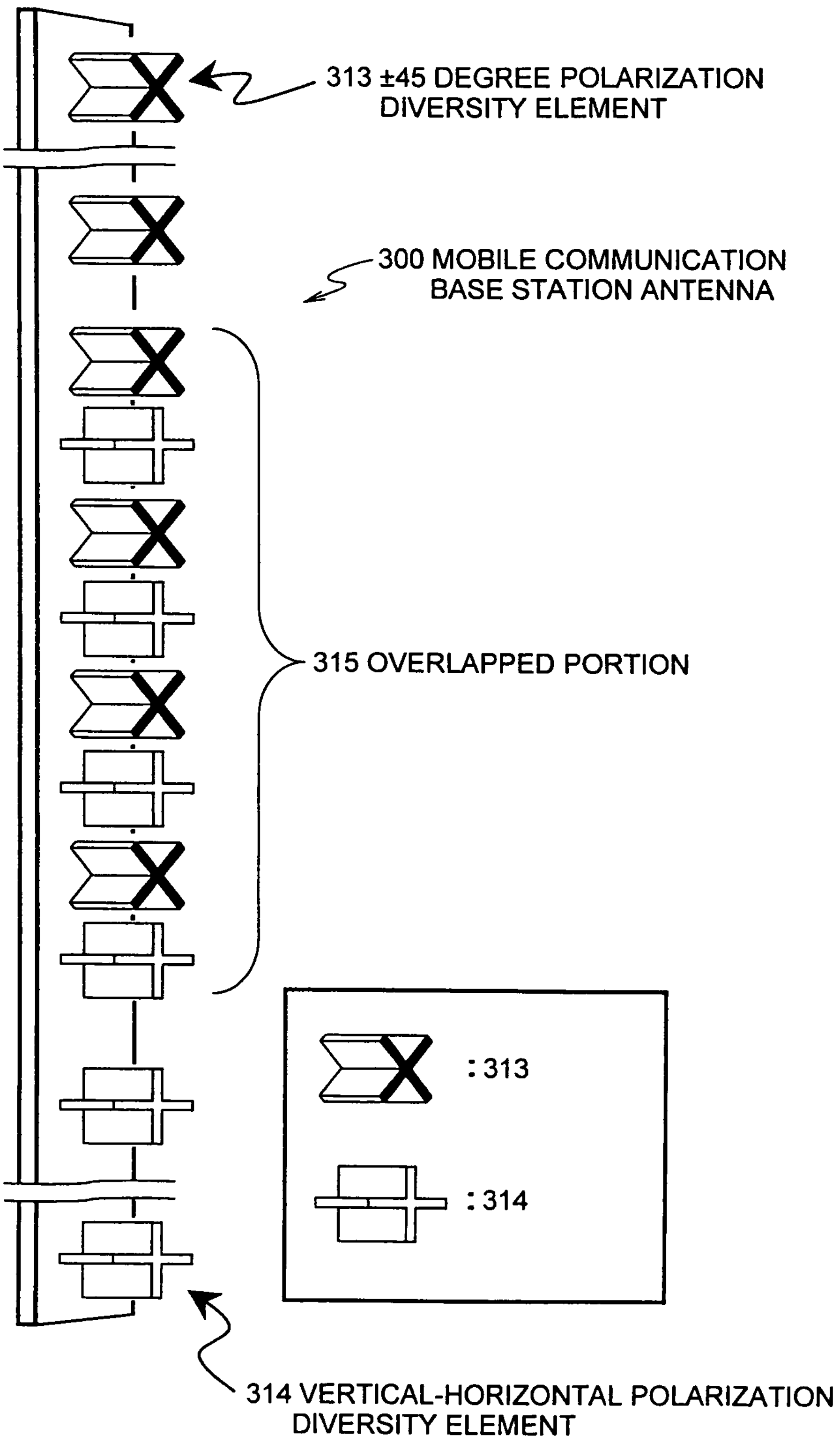
FIG. 8 is a schematic diagram showing a perspective view of the mobile communication base station antenna of FIG. 7.

FIG. 8 is a schematic diagram showing a perspective view of the mobile communication base station antenna 300 of FIG. 7.

Referring to FIG. 8, the polarization diversity antenna elements 313, 314 are disposed with a predetermined interval in the vertical direction. In an overlapped portion 315, the vertical-horizontal polarization diversity elements 314 composing the second polarization diversity antenna block 312 are interposed between each interval between the respective ±45 degree polarization diversity antenna elements 313 composing the first polarization diversity antenna block 311. In FIG. 8, an upper part of each of the ±45 degree polarization diversity antenna elements 313 is colored in black for convenience, so as to clarify a difference between the ±45 degree polarization diversity antenna elements 313 and the vertical-horizontal polarization diversity elements 314. However, there is no difference in appearance between the ±45 degree polarization diversity antenna elements 313 and the vertical-horizontal degree polarization diversity elements 314.

(Adjustment of the Tilt Angle in the Vertical Plane)

In the mobile communication base station antenna 100 of FIG. 1, it is necessary to changing the tilt angle in the vertical plane for providing the antenna correlation coefficient of 0.7 or less, since the polarization diversity antenna elements 113, 114 are so close to each other in the respective polarization diversity antenna blocks 111, 112.

Figure 9:
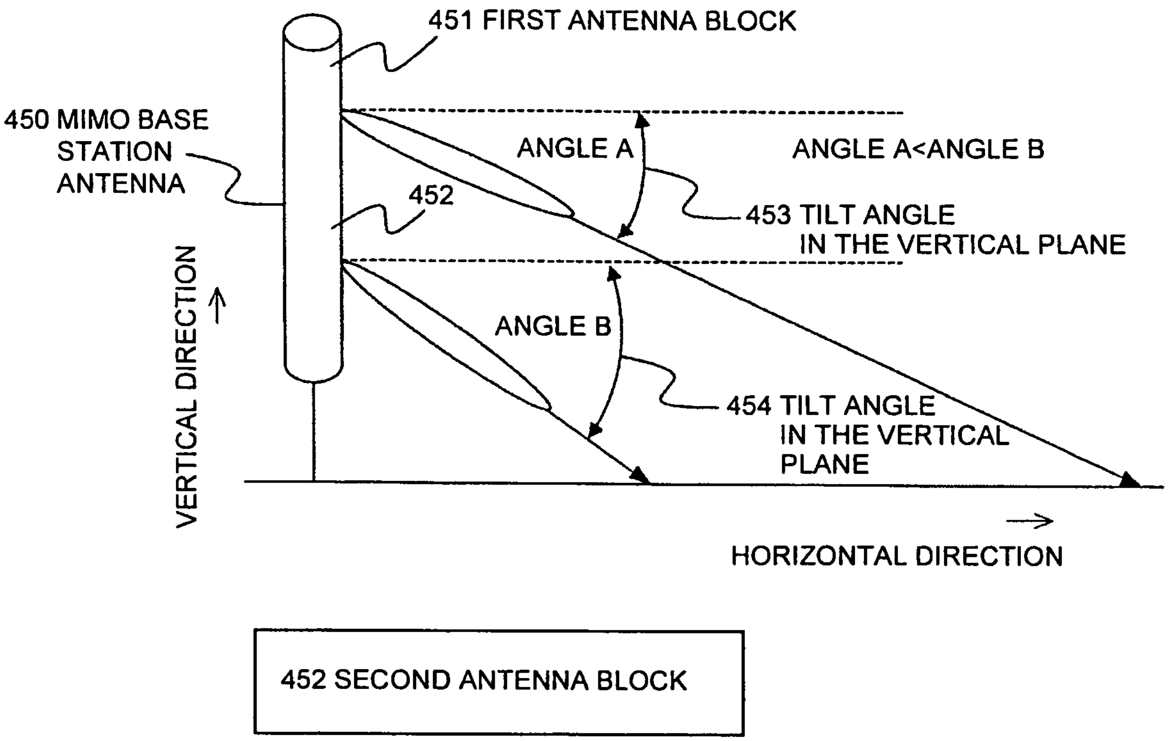
FIG. 9 is an explanatory diagram showing a side view of a mobile communication base station antenna, in which a directivity in the vertical plane thereof is shown.

FIG. 9 is an explanatory diagram showing a side view of a mobile communication base station antenna 450, in which a directivity in the vertical plane thereof is shown.

Referring to FIG. 9, in the present invention, a difference in tilt angle in the vertical plane is provided between a first antenna block 451 comprising antenna elements connected to a first port (not shown) and a second antenna block 452 comprising antenna elements connected to a third port (not shown), that have the same polarization characteristics. Herein, the first antenna block 451 comprising the antenna elements connected to the first port and the second antenna block 452 comprising the antenna elements connected to the third port are collectivities of the antenna elements 12 (cf. FIG. 1), and an antenna block comprising antenna elements connected to a second port and another antenna block comprising antenna elements connected to a fourth port are collectivities of the antenna elements 11 (cf. FIG. 1).

By way of example only, a tilt angle in the vertical plane of the first antenna block 451 comprising the antenna elements connected to the first port is set as 3 degrees and a tilt angle in the vertical plane of the second antenna block 452 comprising the antenna elements connected to the third port is set as 6 degrees. Herein, the antenna block comprising antenna elements connected to the second port and the antenna block comprising antenna elements connected to the fourth port are not shown in FIG. 9 for convenience of explanation.

Referring to FIG. 9, in an MIMO base station antenna 450 which is a mobile communication base station antenna of the present invention, a tilt angle 453 in the vertical plane in the in the antenna element connected to the first port included in the first polarization diversity antenna block 111 (cf. FIG. 1) is set as an angle A, and a tilt angle 454 in the vertical plane in the antenna element connected to the third port included in the second polarization diversity antenna block 112 (cf. FIG. 1) is set as an angle B. Herein, the angle A (degree) is smaller than the angle B (degree) (A<B).

As shown in FIG. 1, the first polarization diversity antenna block 111 and the second polarization diversity antenna block 112 are vertically arranged. Therefore, as shown in FIG. 9, a difference is provided between the angle A of the tilt angle 453 in the vertical plane of the first polarization diversity antenna block 111 (the first antenna block 451 comprising the antenna element connected to the first port) and the angle B of the tilt angle 454 of the second polarization diversity antenna block 112 (the second antenna block 452 comprising the antenna element connected to the third port) that have the same polarization characteristics. Accordingly, the antenna correlation coefficient between the first polarization diversity antenna block 111 and the second polarization diversity antenna block 112 can be decreased.

As described above, since the mobile communication base station antenna has the sharp directivity in the vertical plane, when the tilt angle in the vertical plane is changed, a three-dimensional directivity, particularly a directivity of the main beam varies greatly. Therefore, overlap of the directivities of the respective antenna blocks can be reduced by providing a difference in the tilt angles in the vertical plane, thereby decreasing the correlation coefficient.

This operation of decreasing the correlation coefficient can be conducted in the antenna block comprising the antenna element connected to the second port (the antenna element of the first polarization diversity antenna block 111) and the antenna block comprising the antenna element connected to the fourth port (the antenna element of the second polarization diversity antenna block 112) that have the same polarization characteristics, by providing a difference between the tilt angles in the vertical plane. In addition, this operation of decreasing the correlation coefficient can be also conducted between the respective antenna blocks comprising the antenna elements having different polarization characteristics.

Functions and effects of the present invention will be established below by simulation calculation.

Figures 10A, 10B, 10C, 10D, 10E:
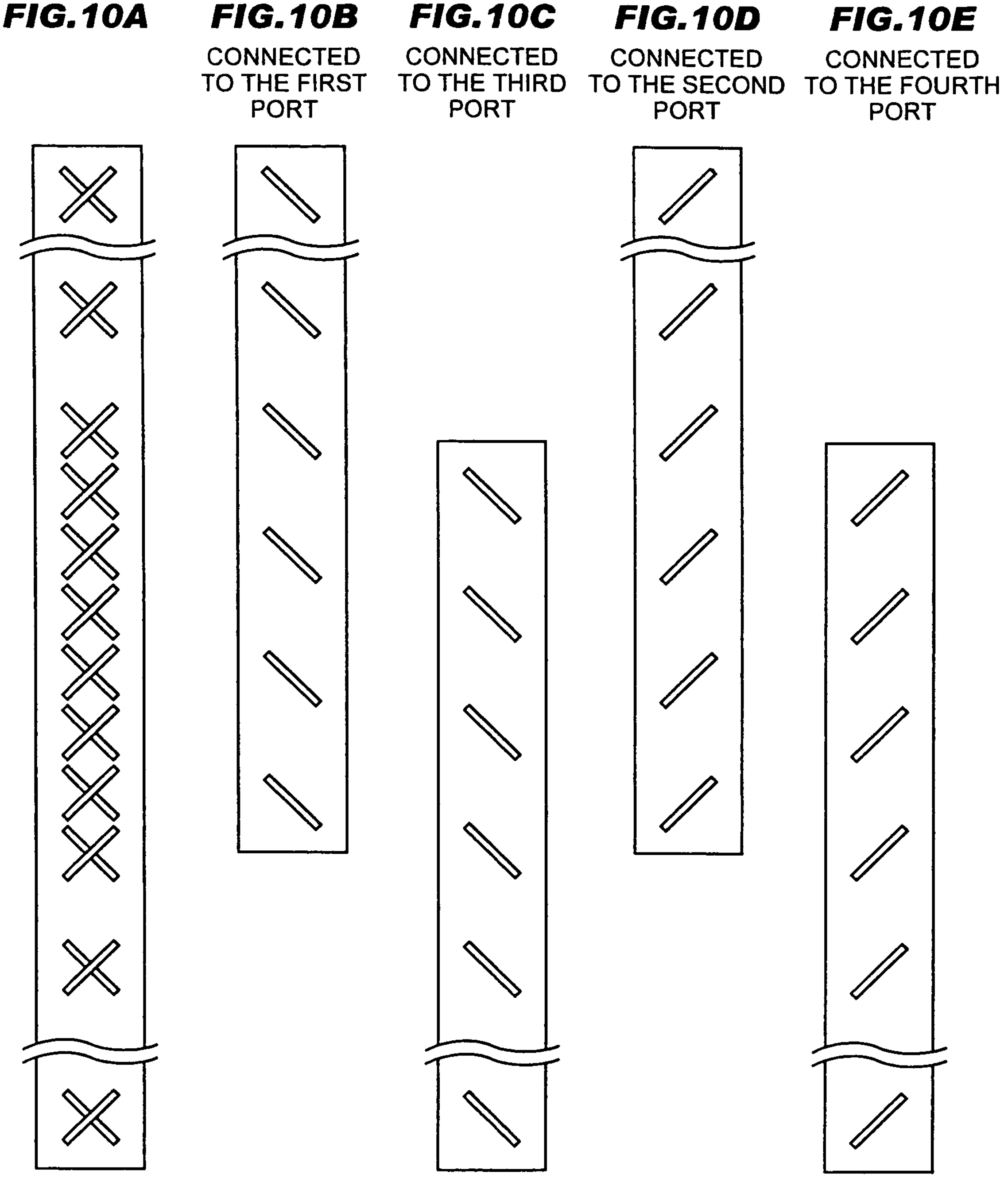

FIGS. 10A to 10E are schematic diagrams showing elevational views of the mobile communication base station antenna of FIG. 1 that are disassembled by antenna blocks comprising antenna elements connected to respective ports, wherein FIG. 10A shows an elevational view of the mobile communication base station antenna comprising antenna blocks, FIG. 10B is an elevational view of an antenna block connected to the first port, FIG. 10C is an elevational view of an antenna block connected to the third port, FIG. 10D is an elevational view of an antenna block connected to the second port, FIG. 10E is an elevational view of an antenna block connected to the fourth port.

Figure 11A:
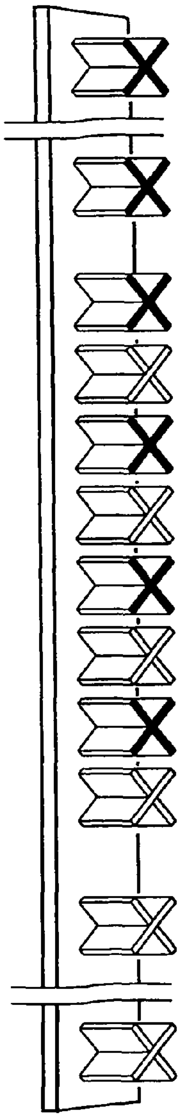
Figure 11B:
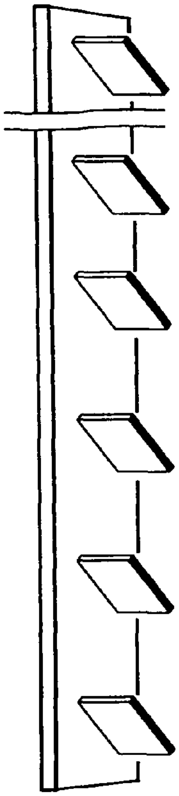
Figure 11C:
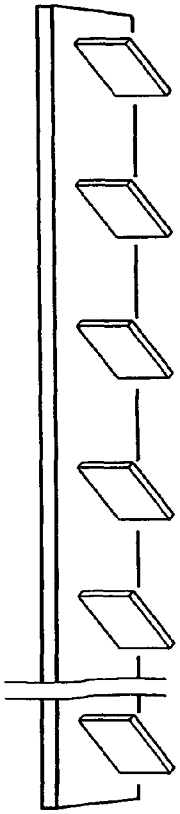
Figure 11D:
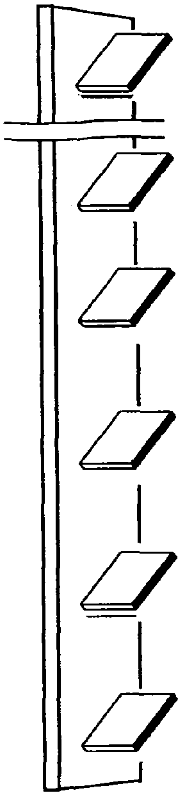
Figure 11E:
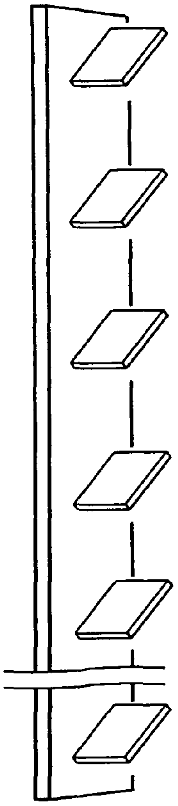

FIGS. 11A to 11E are schematic diagrams showing perspective views of the mobile communication base station antenna of FIG. 1 that are disassembled by antenna blocks comprising antenna elements connected to respective ports, wherein FIG. 11A shows a perspective view of the mobile communication base station antenna comprising antenna blocks, FIG. 11B is a perspective view of an antenna block connected to the first port, FIG. 11C is a perspective view of an antenna block connected to the third port, FIG. 11D is a perspective view of an antenna block connected to the second port, FIG. 11E is a perspective view of an antenna block connected to the fourth port.

As shown in FIGS. 10B to 10E, the mobile communication base station antenna shown in FIG. 10A is disassembled into respective antenna blocks comprising the antenna elements connected to the respective ports. Similarly, as shown in FIGS. 11B to 11E, the mobile communication base station antenna shown in FIG. 11A is disassembled into respective antenna blocks comprising the antenna elements connected to the respective ports.

Figure 12:
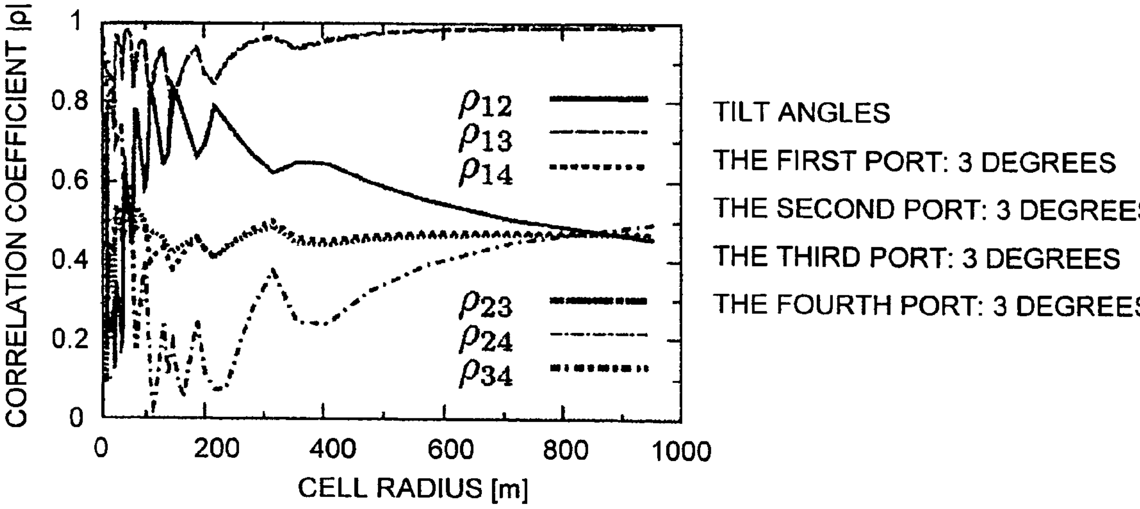
FIG. 12 is a graph showing a relationship of the antenna correlation coefficient between cell radius, when the antenna blocks including the antenna elements connected to the respective ports have tilt angles of 3 degrees in the vertical plane.
Figure 13:
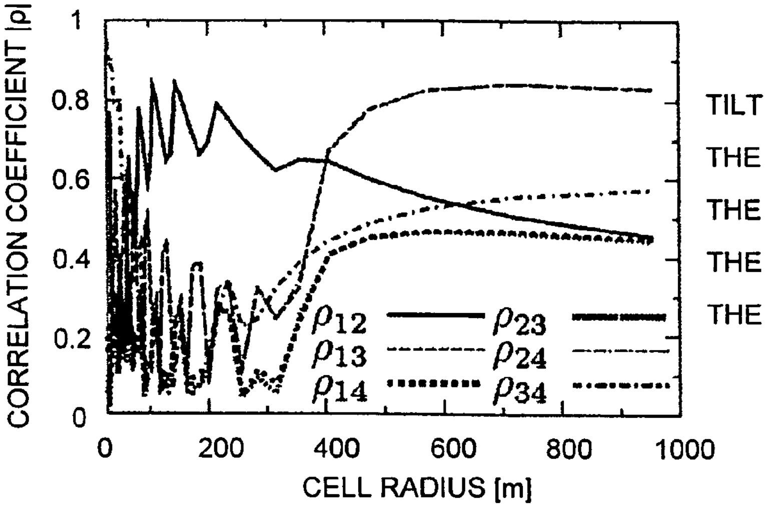
FIG. 13 is a graph showing a relationship of the antenna correlation coefficient between cell radius, when the antenna blocks including the antenna elements connected to the first port and the antenna blocks including the antenna elements connected to the second port have tilt angles of 3 degrees in the vertical plane, and the antenna blocks including the antenna elements connected to the third port and the antenna blocks including the antenna elements connected to the fourth port have tilt angles of 6 degrees in the vertical plane.
Figure 14:
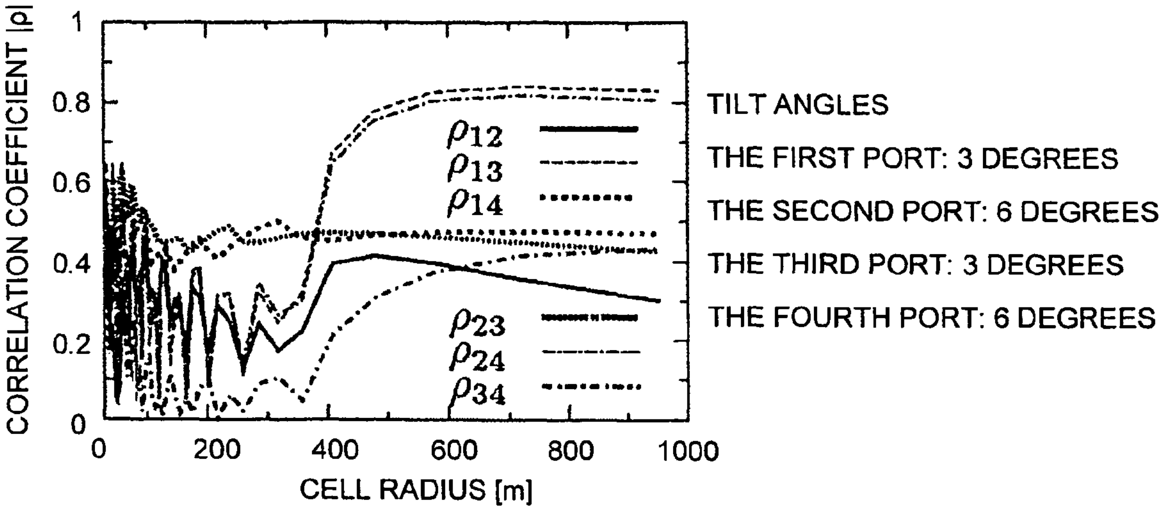
FIG. 14 is a graph showing a relationship of the antenna correlation coefficient between cell radius, when the antenna blocks including the antenna elements connected to the first port and the antenna blocks including the antenna elements connected to the third port have tilt angles of 3 degrees in the vertical plane, and the antenna blocks including the antenna elements connected to the second port and the antenna blocks including the antenna elements connected to the fourth port have tilt angles of 6 degrees in the vertical plane.
Figure 15:
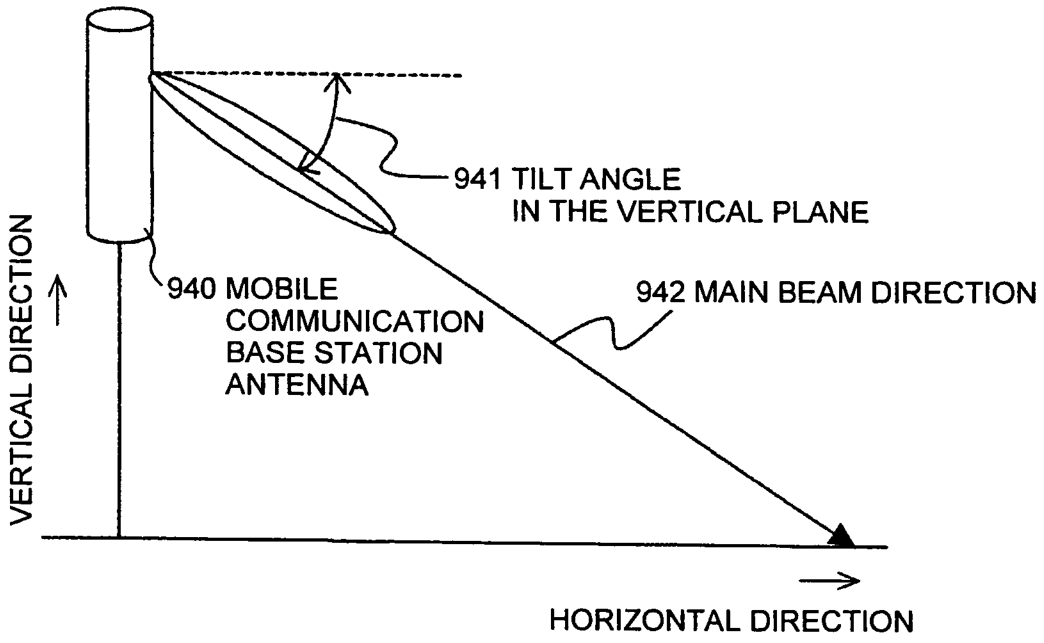
FIG. 15 PRIOR ART
FIG. 15 is an explanatory diagram showing a side view of a mobile communication base station antenna, in which directivity in the vertical plane is shown.
Figure 16:
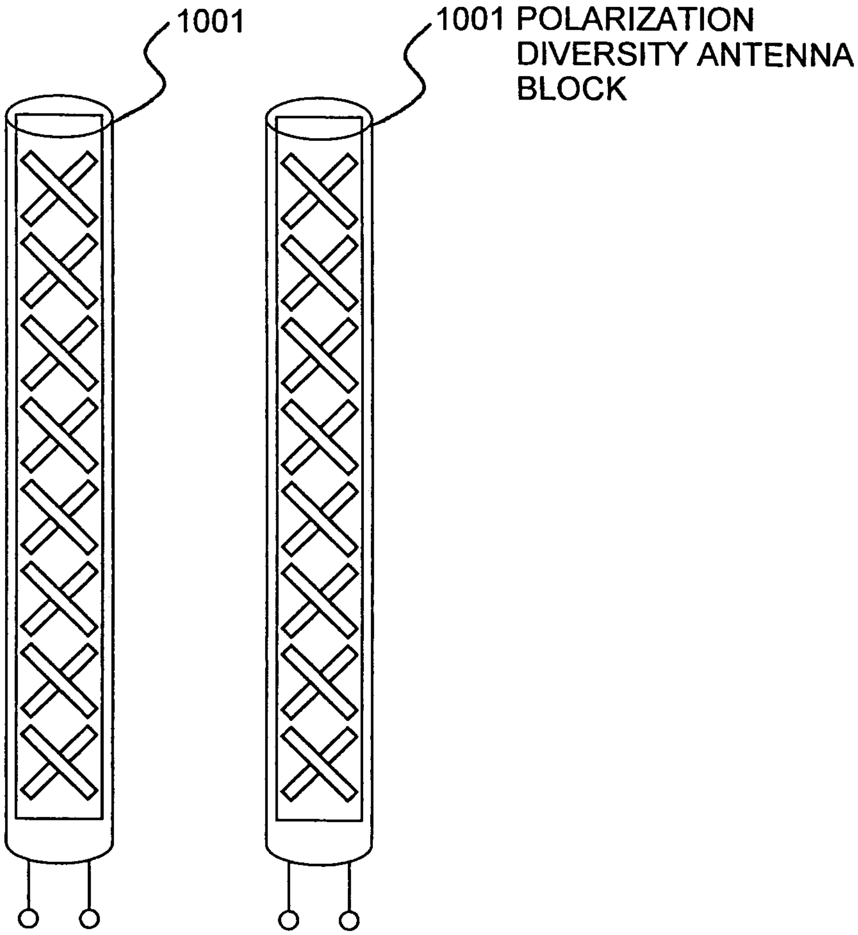
FIG.16 PRIOR ART
FIG. 16 is a schematic diagram showing an elevational view of a conventional 4×4 MIMO communication antenna installation, in which polarization diversity antenna blocks are juxtaposed with each other.
Figure 17:
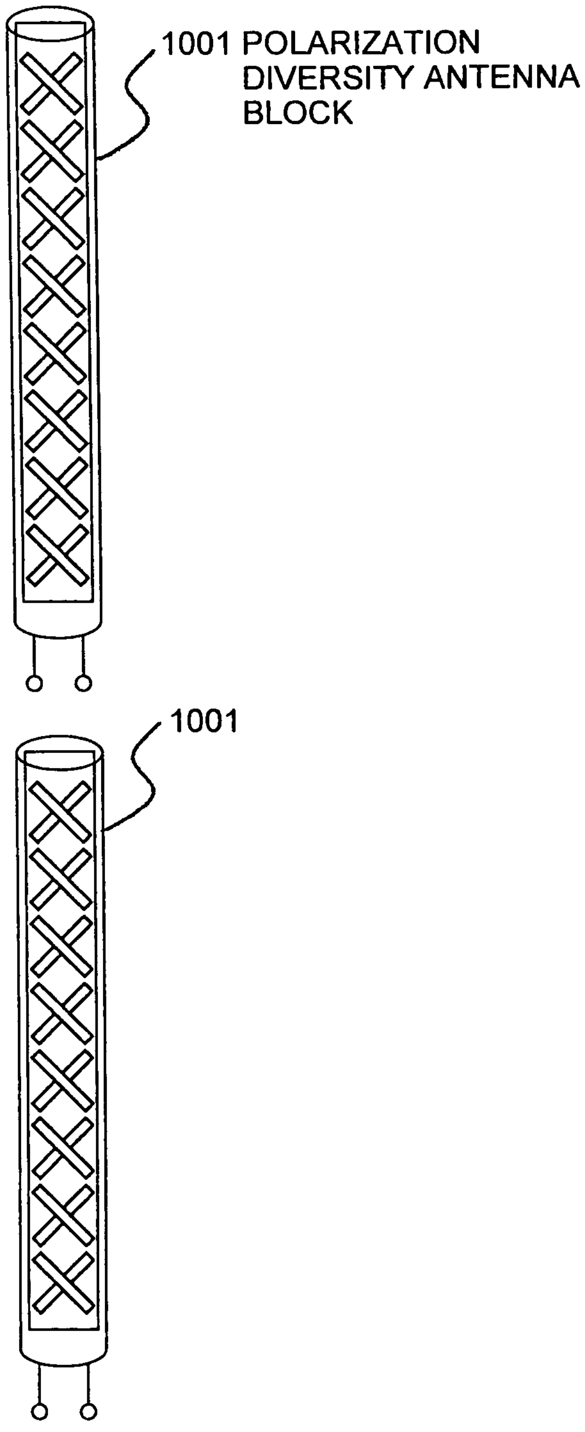
FIG.17 PRIOR ART
FIG. 17 is a schematic diagram showing an elevational view of a conventional 4×4 MIMO communication antenna installation, in which the polarization diversity antenna blocks are vertically arranged in one column.

FIGS. 12 to 14 are graphs showing the simulation results. In the respective graphs, a vertical axis shows an absolute value p of a correlation coefficient between antenna blocks comprising antenna elements connected to the respective ports shown in FIGS. 10A to 10E, and a horizontal axis shows a cell radius of the base station.

FIG. 12 is a graph showing a relationship of the antenna correlation coefficient between the cell radius, when no difference is provided in the tilt angles in the vertical plane between the respective antenna blocks. Namely, the tilt angles in the vertical plane of the antenna block comprising the antenna element connected to the first port, the antenna block comprising the antenna element connected to the second port, the antenna block comprising the antenna element connected to the third port, and the antenna block comprising the antenna element connected to the fourth port are 3 degrees.

FIG. 13 is a graph showing a relationship of the antenna correlation coefficient between the cell radius, when a difference in the tilt angles in the vertical plane between upper antenna block and the lower antenna block is provided. Namely, the tilt angles in the vertical plane of the antenna block comprising the antenna element connected to the first port and the antenna block comprising the antenna element connected to the second port are set as 3 degrees. The tilt angles in the vertical plane of the antenna block comprising the antenna element connected to the third port and the antenna block comprising the antenna element connected to the fourth port are set as 6 degrees.

FIG. 14 is a graph showing a relationship of the antenna correlation coefficient between the cell radius, when the tilt angles in the vertical plane of the antenna blocks including the antenna elements connected to the first port and the antenna blocks including the antenna elements connected to the third port are set as 3 degrees. The tilt angles in the vertical plane of the antenna blocks including the antenna elements connected to the second port and the antenna blocks including the antenna elements connected to the fourth port are set as 6 degrees.

In the antenna block in which the tilt angle in the vertical plane is set as 3 degrees, the main beam is directed to a cell edge (i.e. edge of the cell radius, wherein the cell radius is a radius of an arrival range of the signals). In the other antenna blocks, the tilt angle in the vertical plane is set as 6 degrees which is greater than 3 degrees, so as to suppress the interference with the other cells. In FIGS. 12 to 14, reference numerals indicate two port numbers based on which the correlation coefficient is calculated, for example, "ρ12" indicates the correlation coefficient between the antenna block connected to the first port and the antenna block connected to the second port.

As described above, the correlation coefficient between the antenna blocks can be reduced by adjusting the tilt angle in the vertical plane of the beam such that the directivities will be orthogonal to each other (i.e. the beams will not interfere with each other). Since any null point does not exist in directivities of all ports, enhancement in performance can be expected.

Further, FIG. 14 shows that the correlation coefficient between the antenna blocks can be reduced to be 0.7 or less other in the direction other than the main beam direction (within the cell radius of 400 m).

As described above, an overall length of the mobile communication base station antenna 100 can be shortened by overlapping the antenna elements 11, 12 of the first and second polarization diversity antenna blocks 111, 112 in a middle part of the mobile communication base station antenna in the present invention. It is possible to improve the correlation coefficient between the antenna blocks comprising the antenna element connected to the respective ports by changing the beam tilt angle in the vertical plane (the tilt angle in the vertical plane) between the upper and lower polarization diversity antenna blocks 111, 112.

The directivity can be changed by changing the beam tilt angle in the vertical plane (the tilt angle in the vertical plane) between the upper and lower polarization diversity antenna blocks 111, 112, thereby reducing the correlation coefficient between the polarization diversity antenna blocks 111, 112. Further, a space multiplexing effect of MIMO can be enhanced by decreasing the correlation coefficient between the respective antenna blocks, thereby enhancing the data transmission efficiency.

In FIGS. 12, 13, and 14, only the results of the simulation calculation in the mobile communication base station antenna 100 of FIG. 1 are shown. However, results similar to those in FIGS. 12, 13, and 14 can be provided in the simulation calculation of the mobile communication base station antennas 200, 300 of FIGS. 5 and 7.

In other words, an overall length of the mobile communication base station antenna 200 can be shortened by overlapping the antenna elements of the first and second polarization diversity antenna blocks 211, 212 in a middle part of the mobile communication base station antenna 200. It is possible to improve the correlation coefficient between the antenna blocks 211, 212 comprising the antenna element connected to the respective ports by changing the beam tilt angle in the vertical plane (the tilt angle in the vertical plane) between the upper and lower polarization diversity antenna blocks 211, 212.

The directivity can be changed by changing the beam tilt angle in the vertical plane (the tilt angle in the vertical plane) between the upper and lower polarization diversity antenna blocks 211, 212, thereby reducing the correlation coefficient between the polarization diversity antenna blocks 211, 212. Further, a space multiplexing effect of MIMO can be enhanced by decreasing the correlation coefficient between the respective antenna blocks, thereby enhancing the data transmission efficiency.

Similarly, an overall length of the mobile communication base station antenna 300 can be shortened by overlapping the antenna elements of the first and second polarization diversity antenna blocks 311, 312 in a middle part of the mobile communication base station antenna 300. It is possible to improve the correlation coefficient between the antenna blocks 311, 312 comprising the antenna element connected to the respective ports by changing the beam tilt angle in the vertical plane (the tilt angle in the vertical plane) between the upper and lower polarization diversity antenna blocks 311, 312.

The directivity can be changed by changing the beam tilt angle in the vertical plane (the tilt angle in the vertical plane) between the upper and lower polarization diversity antenna blocks 311, 312, thereby reducing the correlation coefficient between the polarization diversity antenna blocks 311, 312. Further, a space multiplexing effect of MIMO can be enhanced by decreasing the correlation coefficient between the respective antenna blocks, thereby enhancing the data transmission efficiency.

Although the invention has been described, the invention according to claims is not to be limited by the above-mentioned embodiments and examples. Further, please note that not all combinations of the features described in the embodiments and the examples are not necessary to solve the problem of the invention.

What is claimed is:

1. A mobile communication base station antenna, comprising:

a plurality of polarization diversity antenna blocks which carries out Multiple Input Multiple Output (MIMO) communication, each of the polarization diversity antenna blocks comprising a plurality of polarization diversity antenna elements, each of the polarization diversity antenna elements comprising antenna elements that are disposed to be orthogonal to each other, wherein the plurality of the polarization diversity antenna blocks comprise at least one first polarization diversity antenna block including polarization diversity antenna block elements and at least one second polarization diversity antenna block including polarization diversity antenna elements, and the polarization diversity antenna elements of the first polarization diversity antenna block are located outside the second polarization antenna block, wherein tilt angles in a vertical plane of respective polarization diversity antenna blocks are different from each other, wherein, in a plan view, centers of the polarization diversity antenna elements of said at least one first polarization diversity antenna block are located between centers of the polarization diversity antenna elements of said at least one second polarization diversity antenna block in an overlapped area of the antenna, and wherein, in the plan view, a part of the polarization diversity antenna elements of said at least one first polarization diversity antenna block and a part of the polarization diversity antenna elements of said at least one second polarization diversity antenna block are located outside the overlapped area of the antenna.

2. The mobile communication base station antenna according to claim 1, wherein the plurality of the polarization diversity antenna blocks are vertically arranged, and wherein the tilt angles in the vertical plane of the respective polarization diversity antenna blocks are determined such that a correlation coefficient between the respective polarization diversity antenna blocks is 0.7 or less.

3. The mobile communication base station antenna according to claim 1, wherein the tilt angles in the vertical plane of the respective polarization diversity antenna blocks are arbitrarily set by mechanically changing a direction of each of the polarization diversity antenna blocks.

4. The mobile communication base station antenna according to claim 1, wherein the tilt angles in the vertical plane of the respective polarization diversity antenna blocks are arbitrarily set by shifting a signal phase by a phase shifter.

5. The mobile communication base station antenna according to claim 4, wherein the phase shifter comprises a fixed phase shifter in which a shift amount of the signal phase is fixed.

6. The mobile communication base station antenna according to claim 4, wherein the phase shifter comprises a variable phase shifter in which a shift amount of the signal phase is freely determined.

7. The mobile communication base station antenna according to claim 1, wherein the plurality of polarization diversity antenna blocks is arranged linearly.

8. The mobile communication base station antenna according to claim 1, wherein the plurality of polarization diversity antenna blocks is arranged in a line such that the centers of the polarization diversity antenna elements of said at least one first polarization diversity antenna block and the centers of the polarization diversity antenna elements of said at least one second polarization diversity antenna block are located on the line.

9. The mobile communication base station antenna according to claim 1, wherein central parts of two sets of the antenna including two ports are partially overlapped.

10. The mobile communication base station antenna according to claim 9, wherein the antenna elements are disposed vertically to ground to form an antenna that includes four ports in one radome.

11. The mobile communication base station antenna according to claim 1, wherein, in the plan view, outside the overlapped area of the antenna, the polarization diversity antenna elements of said at least one first polarization diversity antenna block are located adjacent to each other.

12. The mobile communication base station antenna according to claim 1, wherein the plurality of the polarization diversity antenna blocks have a same polarization characteristic.

13. The mobile communication base station antenna according to claim 1, wherein the plurality of polarization diversity antenna blocks consists of said at least one first polarization diversity antenna block and said at least one second polarization diversity antenna block.

14. The mobile communication base station antenna according to claim 13, wherein the polarization diversity antenna elements of said at least one second polarization diversity antenna blocks are interposed only between said at least one first polarization diversity antenna block.

15. The mobile communication base station antenna according to claim 1, wherein the polarization diversity antenna blocks are limited to two of the polarization diversity antenna blocks.

16. The mobile communication base station antenna according to claim 1, wherein antenna element pairs included in said at least one first polarization diversity antenna block and antenna element pairs included in said at least one second polarization diversity antenna block are arranged alternately in a vertical direction of the vertical plane, only partially, rather than over an entire length of the vertical plane in the vertical direction.

17. The mobile communication base station antenna according to claim 1, wherein antenna element pairs included in said at least one first polarization diversity antenna block and antenna element pairs included in said at least one second polarization diversity antenna block are arranged in a vertical direction of the vertical plane in a linear column that extends from a lower part of the vertical plane to an upper part of the vertical plane.

18. The mobile communication base station antenna according to claim 17, wherein, in the lower part and the upper part of the vertical plane, the antenna element pairs included in said at least one first polarization diversity antenna block and the antenna element pairs included in said at least one second polarization diversity antenna block are not arranged alternately in the vertical direction of the vertical plane.

* * * * *